United States Patent [19]

Martin

[11] 4,350,351
[45] Sep. 21, 1982

[54] MANHOLE JOINT GASKET ASSEMBLY AND JOINT FORMED THEREWITH

[76] Inventor: A. Eugene Martin, Terre Hill, Pa. 17581

[21] Appl. No.: 217,549

[22] Filed: Dec. 17, 1980

[51] Int. Cl.³ .......................... F16J 15/10; F16J 15/46
[52] U.S. Cl. .............................. 277/207 A; 277/34.3; 277/153; 277/166; 285/110; 285/230; 285/345
[58] Field of Search ................. 277/152, 153, 207 R, 277/1, 207 A, 34, 34.6, 166, 34.3; 285/110, 230, 231, 345, 232

[56] References Cited

U.S. PATENT DOCUMENTS

| 3,084,944 | 4/1963 | Stucke | 277/153 X |
| 3,744,806 | 7/1973 | Keyser | 277/152 |
| 3,787,061 | 1/1974 | Yoakum | 285/110 X |
| 3,973,783 | 8/1976 | Skinner et al. | 285/231 X |
| 3,982,777 | 9/1976 | Martin | 285/351 X |
| 4,018,461 | 4/1977 | Bram | 285/345 X |
| 4,044,443 | 8/1977 | Chartet | 285/192 X |
| 4,073,048 | 2/1978 | Ditcher | 277/34.3 X |
| 4,103,901 | 8/1978 | Ditcher | 285/230 X |
| 4,202,555 | 5/1980 | Becker et al. | 277/166 X |

FOREIGN PATENT DOCUMENTS 251778  5/1964  Australia ............................ 277/34.3

Primary Examiner—Robert S. Ward, Jr.
Attorney, Agent, or Firm—Paul & Paul

[57] ABSTRACT

A connection between a pipe (principally sewer pipe) and the wall of a manhole or like structure, whereby a hole passing through the wall of the manhole is provided with an embedded gasket which, without the presence of a pipe, is more closed in inner circumference inwardly of the manhole than at the location of its embedment in the manhole wall, such that when a pipe is inserted into the gasket, its opening stretches, and in stretching does so at a location along the inwardly-extending sleeve of the gasket that is farthest into the manhole, for tight sealing engagement around the pipe. An integral bead, comprising part of the gasket forms a pressure ring, for increased sealing engagement with the pipe. An additional ring is provided outwardly of the gasket sleeve, also disposed against the integral bead, and optionally adhesively secured thereto, for additional sealing engagement with the pipe, and the additional ring is compressible for compressed engagement between the gasket sleeve and the manhole wall, for further tight sealing against the pipe. The compressible ring is originally hollow, and may optionally be provided with a preferably liquid-like sealant therein, that provides an additional pressure inwardly of the ring, for further sealing engagement.

15 Claims, 3 Drawing Figures

MANHOLE JOINT GASKET ASSEMBLY AND JOINT FORMED THEREWITH

This invention is an improvement upon the invention of my U.S. Pat. No. 3,982,777, the complete disclosure of which is herein incorporated by reference, and it is a further improvement upon my invention of U.S. patent application Ser. No. 70,719, filed Aug. 29, 1979, now abandoned.

BACKGROUND OF THE INVENTION

In connecting sewer pipe to manholes, various techniques are employed. Some of these are discussed in my above-mentioned U.S. patent.

In many of the prior art devices available, a clamping ring, generally of metal construction (similar to a radiator clamp) is used to clamp a part of the gasket to the pipe, in order to prevent passage of water through the manhole wall, at that point in the wall in which a pipe communicates with the interior of the manhole.

In the invention of my above-identified patent, I eliminated the separate clamp as such, and utilized a pair of rings for effecting a good sealing condition between the pipe and the wall of the manhole.

In the more-recent invention of my above-mentioned patent application, I disclosed a gasket which was an improvement in terms of labor saving, as well as in terms of simplicity and ease of construction, and which especially is an easy device to assemble, in that it minimized the number of parts, requiring only a gasket.

However, in some instances, the joint between the pipe and the manhole is subjected to significant pressures, which instances are prone to cause leakage around the pipe, through the manhole wall. Such instances can include situations in which high ground water, or an increased water table causes a pressure head outside the manhole, keeping a high and constant pressure on the joint. In many such situations, it is undesirable to have ground water leaking into the manhole, so as to inhibit the ability of the manhole to carry away water that it is intended to receive via pipes.

Accordingly, the present invention is directed toward providing the ability of the gasket assembly to withstand high water pressures, and to permit a highly-effective water-tight seal under conditions in which the seal is subjected to high exterior pressures that may otherwise tend to promote leakage.

SUMMARY OF THE INVENTION

In accordance with my present invention, the gasket assembly employs a gasket and an additional ring, with the gasket having a bead on the sleeve that embraces the pipe, with the bead being at the exterior of the sleeve, and at the end of the sleeve, such that it is one of the more significantly stretched components of the sleeve when a pipe is received in the sleeve, and with the separate ring being also resilient, for assisting the application of pressure against a pipe, but with the ring being compressible as well, so as to engage the manhole wall and with its adjacent portion of the sleeve, being essentially compressed between the pipe and the manhole wall. The bead on the sleeve has a configuration relative to the exterior configuration of the separate ring that resists dislodgement of the ring upon insertion of a pipe. Optionally, the ring is hollow for receipt of an additional sealing substance therein, and optionally the ring may be adhesively secured to the bead.

Accordingly, it is a primary object of this invention to provide a novel gasket assembly.

It is a further object to provide a novel manhole joint that includes a gasket assembly of a gasket and a separate ring.

Other objects and advantages of the present invention will become readily apparent, with reference to the following brief descriptions of the drawing figures, detailed description of the preferred embodiment, and the appended claims.

BRIEF DESCRIPTIONS OF THE DRAWING FIGURES

DETAILED DESCRIPTION OF THE PREFERRED EMBODIMENT

Figure 1:
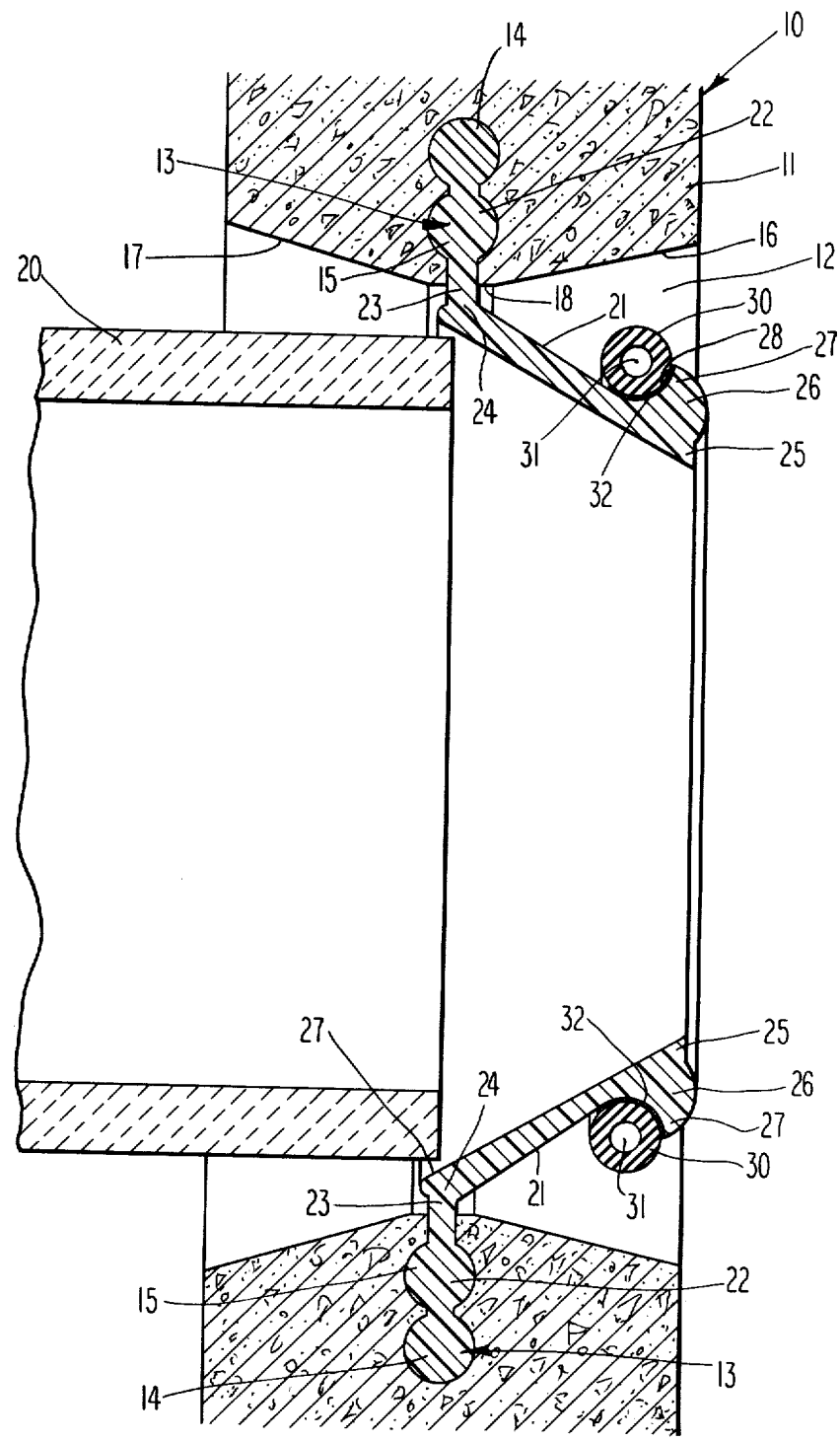
FIG. 1 is a vertical sectional view, through a portion of a manhole wall and pipe that together form a manhole joint, as well as through the gasket assembly in accordance with this invention.

With reference to FIG. 1, there is illustrated a manhole generally designated by the numeral 10, having an upstanding wall 11, and a hole 12 therein, with the hole 12 being generally circular in configuration when viewed from inside or outside the manhole 10. The manhole is generally of poured-concrete construction, and the gasket 13 is fixed in position while the concrete of the manhole wall is poured in place about the gasket, with the peripheral edges 14 and 15 of the gasket 13 being engaged by the concrete after it sets up or hardens, to be firmly kept in place.

The hole 12 is generally defined by frusto-conically configured surfaces 16 and 17 giving sloped or tapered appearances when viewed in cross-section as in FIG. 1, connected by cylindrical portions 18.

A pipe 20, generally of vitrified clay or the like may be used, and it is generally positioned into the gasket 13, to engage a gasket sleeve portion 21 thereof, from its inside, by movement of the pipe from left to right as viewed in FIG. 1. It will be apparent that the pipe 20 will preferably be cylindrical in construction. The pipe 20 has a longitudinal center line (not shown) that will preferably be substantially perpendicular to the wall 11 of the manhole, as well as being in a radial direction relative to the wall, but it will be understood that, in accordance with this invention, the pipe 20 may be angularly canted or oriented such that its center line extends into the gasket's sleeve portion 21 such that its center line enters the gasket sleeve portion from any of a number of angular dispositions.

The gasket 13 is constructed of a rubber-like material which may be natural gum rubber, or the like, but will preferably be a combination of neoprene and isoprene, and will preferably have a durometer hardness within the range of 50 to 70. However, it will be apparent that various rubber-like materials, resilient in nature, will be acceptable for the purposes of this invention.

The gasket 13 is provided with an outer flange portion 22, in addition to the sleeve portion. It is the flange portion 22 that has the peripheral and preferably concentric beads 14 and 15 molded therein, with an extension portion 23 extending radially inwardly, to join with the sleeve portion 21 at a juncture 24. The sleeve portion 21 is preferably frusto-conical, but this is not absolutely required. Most preferably, however, the longitudinally inner-most end 25 of the sleeve should have a free, unstretched diameter at its right-most end as viewed in FIG. 1, substantially less than the external diameter of the pipe 20 (assuming circular cross-section pipe and similar cross-section sleeve, although other cross-sections of each may be utilized if desired, within the spirit and scope of this invention). The other end of the sleeve, that is radially outer-most relative to the interior of the manhole, will generally have an internal diamension 27 that is slightly larger in diameter than the external diameter of the pipe, to facilitate each of initiating the entry of the pipe into the sleeve portion of the gasket. It will be appreciated that, if desired, the sleeve portion of the gasket, in cross section, rather than appearing in straight line as indicated in FIG. 1, could easily be otherwise constructed to be curved, or of non-straight line cross-section, if desired.

It will further be noted that the sleeve is provided at 26, with an integral pressure ring, constructed preferably of the same material as the rest of the gasket, and which will facilitate tight gripping engagement with the periphery of the pipe upon assembly.

It will be noted that the integral bead 26 has a reverse curl 27 formed by a concavely-cut or formed surface portion 28, circumferentially thereabout, which surface portion 28 complementally receives the exterior surface of a ring 30, to prevent ring dislodgment upon pipe insertion as is addressed hereinafter. The ring 30 is likewise of rubber or rubber-like construction, and is resilient and stretchable, and is preferably circular in cross-section, as shown in FIG. 1, to be accommodated and received against surface 28 of the bead 26. The ring 30 is also compressible, as will be described hereinafter, and is preferably constructed with a hollow annulus 31 therein.

Furthermore, an adhesive of the rubber cement type or the like 32 is preferably, but optionally, applied to surface 28 of the bead 26, and to the adjacent sleeve portion, in amounts sufficient to adhere the ring 30 thereto, as shown in FIG. 1.

The ring 30 is separate from the bead 26, and is applied over the bead 26, nested against surface portion 28 as shown, so that, upon insertion of the pipe 20 into the sleeve 21, and consequent stretching of the frusto-conical portion of the sleeve 21, the bead ring 30 will not be pushed up over the bead 26 upon assembly of the joint.

Figure 2:
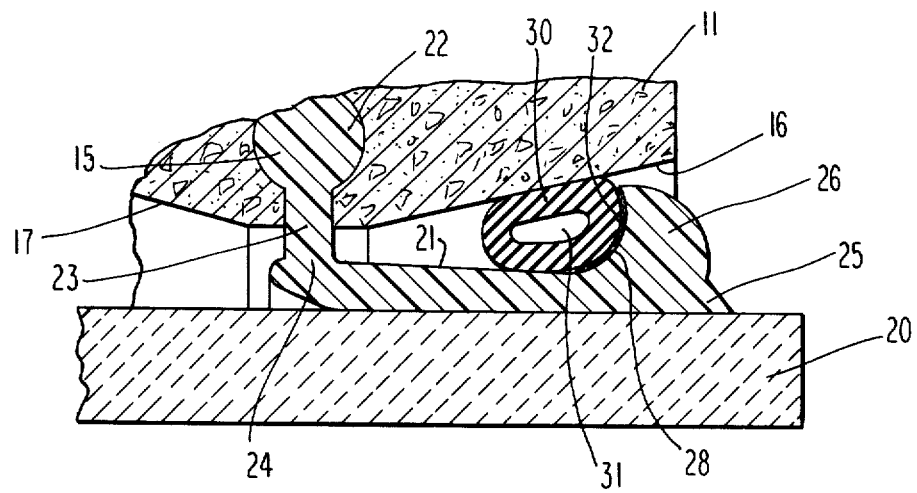
FIG. 2 is an enlarged fragmentary sectional view, taken along the same line as the view of FIG. 1, but wherein the pipe is shown in its inserted position, and with the gasket in its stretched position, so that the sleeve portion of the gasket is essentially cylindrical, and with a separate ring being shown in its compressed position between the manhole wall and the sleeve of the gasket.
Figure 3:
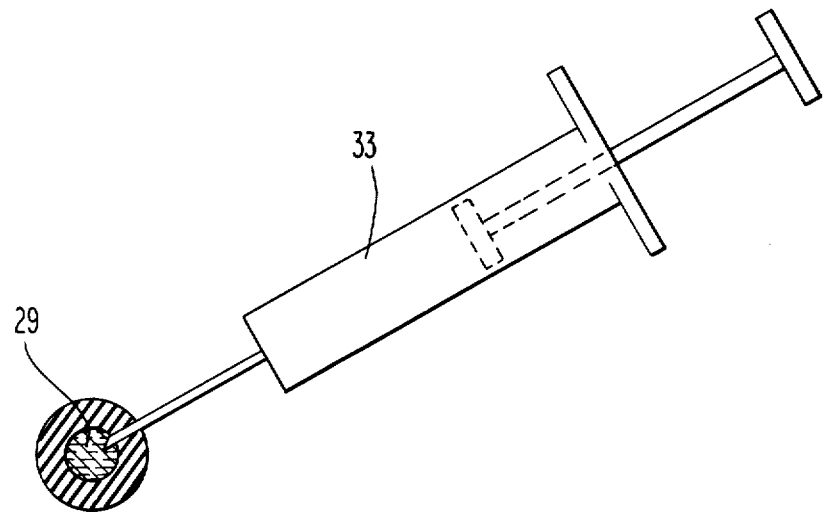
FIG. 3 is a transverse sectional view, taken through the separate ring of the gasket assembly of this invention, and with a hypodermic being illustrated in position for filling the hollow ring with a sealable substance.

With particular reference to FIG. 2, it will be seen that, upon insertion of the pipe 20 into the sleeve 21, the sleeve 21 will be stretched into essentially cylindrical configuration, as shown, from the frusto-conical configuration illustrated therefor in FIG. 1, with the head 26 likewise being stretched, and with the separate ring 30 also being stretched annularly, but being compressed between the surface 16 that defines the hole in the manhole wall 11 at that point, and the sleeve 21, as shown, to utilize the adjacent surface 16 of the manhole, as a means for further applying pressure of the gasket against the pipe 20.

In accordance with this invention, the ring 30 is of hollow construction, having an interior 31 that is adaptable to receive an additional sealing substance 29 therein. The substance 29 can be injected into the annulus 31, by means of a hypodermic 33 or the like, so that the substance 29 resides in the annulus 31, under pressure. The additional sealing substance 29 may be applied prior to insertion of the pipe 20 and consequent compression of the ring 30, or it may be applied thereafter, after the joint is in the disposition illustrated in FIG. 2. The substance 29 may either be a rubber-like sealant or asphalt base material preferably containing asbestos fibers, or in the alternative, it may be a two-component foam-forming, originally liquid substance that expands into a foam-like solid stage, under pressure, within the annulus 31. In any event the substance 32, when inserted into the annulus 31, under pressure, will serve to further sealingly engage the gasket against the pipe, to assure a tight joint seal.

It will be apparent from the foregoing, that various modifications may be made in the details of construction, as well as in the materials and use and operation of the present invention, all within the sphere and scope of the invention as defined in the appended claims.

What is claimed is:

1. A manhole joint gasket assembly for use in joints where pipe is sealingly joined to a manhole through a hole in the wall of the manhole, the assembly including a gasket constructed of rubber-like material and comprising an outer generally radially disposed flange portion of generally ring-like shape for engagement with a manhole wall, and an inner longitudinally extensive sleeve portion; said sleeve portion being joined at its one end to said flange portion and having a free opposite end remote from said flange portion; with the inner periphery of the opposite end of said sleeve portion being of a smaller dimension than the inner periphery of the said one end of said sleeve portion; with at least said sleeve portion being resiliently stretchable at its said opposite end for receiving a pipe therein of larger periphery than the inner periphery of the said opposite end of said sleeve, and wherein said opposite end of said sleeve is provided with a thickened bead portion around its periphery, substantially thicker than the wall thickness of an adjacent said sleeve portion, and including a separate resiliently stretchable ring constructed of rubber-like material disposed about said sleeve portion adjacent to said bead portion.

2. The gasket assembly of claim 1, wherein said sleeve portion is of generally frusto-conical configuration in its unstretched condition.

3. The gasket assembly of claim 1, wherein said ring is adhered to said bead portion.

4. The gasket assembly of claim 1, wherein said ring is of generally circular cross-section and the surface of said bead portion adjacent to said ring is complementally configured for receiving said ring therein, and comprising means for resisting the ring being pushed over the bead upon inserting a pipe through the sleeve.

5. The gasket assembly of claim 1, wherein said ring is resiliently compressible and dimensioned and located on said sleeve to comprise means forming a circumferential compressible seal between the manhole wall and the sleeve upon inserting a pipe through the sleeve, and when the gasket is carried in a manhole wall.

6. The gasket assembly of claim 1, wherein said ring is hollow, defining an annulus therein, for optionally receiving a sealing substance therein.

7. The gasket assembly of claim 1, wherein said ring is of generally circular cross-section and the surface of said bead portion adjacent to said ring is complementally configured for receiving said ring therein, and comprising means for resisting the ring being pushed over the bead upon inserting a pipe through the sleeve, wherein said ring is resiliently compressible and dimensioned and located on said sleeve to comprise means forming a circumferential compressible seal between the manhole wall and the sleeve upon inserting a pipe through the sleeve, and when the gasket is carried in a manhole wall, and wherein said ring is hollow, defining an annulus therein, for optionally receiving a sealing substance therein.

8. The gasket assembly of claim 7, wherein said ring is adhered to said bead portion.

9. A manhole joint including a gasket assembly according to claim 1 in conjunction with a manhole and a pipe, with the manhole having a hole in a generally upstanding wall thereof; with the manhole having most of the said flange portion embedded in the wall of the manhole with the sleeve portion of the gasket extending from said flange portion in a direction toward the interior of the manhole, and with the pipe being disposed through the sleeve portion of said gasket; with said sleeve being in resiliently stretched relation about the periphery of said pipe, in tight sealing engagement therewith.

10. A manhole joint according to claim 9, wherein said ring is adhered to said bead portion.

11. A manhole joint according to claim 9, wherein said ring is of generally circular cross-section and the surface of said bead portion adjacent to said ring is complementally configured for receiving said ring therein, and comprising means for resisting the ring being pushed over the bead upon inserting a pipe through the sleeve.

12. A manhole joint according to claim 9 with said ring being in resiliently compressed condition between said sleeve and the wall of the manhole, and with the sleeve being in pressed engagement about the periphery of the pipe.

13. A manhole joint according to claim 12, wherein the ring is constructed as a hollow annulus and with a sealing material being disposed in said annulus.

14. A manhole joint according to claim 13, wherein the sealing material in said annulus is under greater-than-atmospheric pressure.

15. A manhole joint according to claim 9, wherein said ring is adhered to said bead portion, wherein said ring is of generally circular cross-section and the surface of said bead portion adjacent to said ring is complementally configured for receiving said ring therein, and comprising means for resisting the ring being pushed over the bead upon inserting a pipe through the sleeve, with said ring being in resiliently compressed condition between said sleeve and the wall of the manhole, and with the sleeve being in pressed engagement about the periphery of the pipe, wherein the ring is constructed as a hollow annulus and with a sealing material being disposed in said annulus, wherein the sealing material in said annulus is under greater-than-atmospheric pressure.

* * * * *